United States Patent
Liu et al.

(10) Patent No.: US 11,714,010 B2
(45) Date of Patent: Aug. 1, 2023

(54) REACTOR TEMPERATURE MEASUREMENT SYSTEM, REACTOR AND METHOD FOR PREPARING A FIBER BRAGG GRATING

(71) Applicants: Shanghai Huayi New Material Co., Ltd., Shanghai (CN); Shanghai University, Shanghai (CN)

(72) Inventors: Yunqi Liu, Shanghai (CN); Xiaolong Si, Shanghai (CN); Linfang Wu, Shanghai (CN); Chengbo Mou, Shanghai (CN); Yan Zhuang, Shanghai (CN)

(73) Assignees: Shanghai Huayi New Material Co., Ltd., Shanghai (CN); Shanghai University, Shanghai (CN)

( * ) Notice: Subject to any disclaimer, the term of this patent is extended or adjusted under 35 U.S.C. 154(b) by 34 days.

(21) Appl. No.: 17/144,984

(22) Filed: Jan. 8, 2021

(65) Prior Publication Data
US 2022/0026288 A1    Jan. 27, 2022

(30) Foreign Application Priority Data
Jul. 27, 2020    (CN) .......................... 202010734478.2

(51) Int. Cl.
*G01K 11/3206*    (2021.01)
*G01K 13/00*    (2021.01)
*G02B 6/02*    (2006.01)

(52) U.S. Cl.
CPC .......... *G01K 11/3206* (2013.01); *G01K 13/00* (2013.01); *G02B 6/02123* (2013.01)

(58) Field of Classification Search
USPC ......................................................... 374/161
See application file for complete search history.

(56) References Cited

U.S. PATENT DOCUMENTS 10,173,190 B2    1/2019    Egner et al.

FOREIGN PATENT DOCUMENTS

| CN | 101710004 A | * | 5/2010 |
| CN | 103528622 A | * | 1/2014 |
| CN | 103714869 A | * | 4/2014 |
| CN | 104266603 A | * | 1/2015 |
| CN | 104634477 A | * | 5/2015 |

(Continued)

OTHER PUBLICATIONS

Translation of CN111397643A (Year: 2020).*

(Continued)

*Primary Examiner* — Mirellys Jagan
(74) *Attorney, Agent, or Firm* — Quarles & Brady LLP (57) ABSTRACT

A reactor temperature measurement system includes a Fiber Bragg Grating sensor array arranged in a body of the reactor for monitoring temperatures at multiple positions in an axial direction of the body to obtain temperature sensing optical signals; and a fiber grating demodulator, connected to the Fiber Bragg Grating sensor array, and used to demodulate the temperature sensing optical signals. A method for preparing a Fiber Bragg Grating includes preparing a Fiber Bragg Grating by using a single-mode fiber and annealing the Fiber Bragg Grating, which includes heating the Fiber Bragg Grating to a temperature above 400° C. and maintaining for 100 to 200 hours.

15 Claims, 3 Drawing Sheets

(56) References Cited

FOREIGN PATENT DOCUMENTS

| | | | | |
|---|---|---|---|---|
| CN | 204373808 | U | * | 6/2015 |
| CN | 110954240 | A | * | 4/2020 |
| CN | 111397643 | A | | 7/2020 |
| CN | 114184301 | A | * | 3/2022 |
| DE | 102004031324 | A1 | | 1/2006 |
| DE | 102014226577 | A1 | | 6/2016 |
| EP | 0737984 | A1 | * | 10/1996 |
| WO | 0210677 | A1 | | 2/2002 |

OTHER PUBLICATIONS

Translation of DE102004031324A1 (Year: 2006).*
Translation of DE102014226577A1 (Year: 2016).*
European Patent Office, Extended Search Report, Application No. 20213512.5, dated Aug. 27, 2021, 12 pages.

* cited by examiner

REACTOR TEMPERATURE MEASUREMENT SYSTEM, REACTOR AND METHOD FOR PREPARING A FIBER BRAGG GRATING

CROSS-REFERENCE TO RELATED APPLICATIONS

This application claims priority to Chinese Application No. 202010734478.2 filed Jul. 27, 2020, the disclosure of which is incorporated herein by reference in its entirety and for all purposes.

FIELD OF THE INVENTION

The present disclosure relates to optical fiber grating sensing technology, in particular to a reactor temperature measurement system, a reactor and a method for preparing a Fiber Bragg Grating.

BACKGROUND

The fixed bed reactor is one of the important equipments in a chemical plant. In many industrial occasions, equipments such as fixed bed reactors are working in an environment within a relatively high range of temperature. The fixed bed reactor is filled with solid catalysts or solid reactants to realize the multiphase reaction process, and the working temperature is as high as several hundred degrees Celsius. Whether the fixed bed reactor can operate normally during the working period directly affects whether the chemical plant can achieve safe production. Real-time monitoring of the working environment temperature of equipments such as fixed bed reactors, is not only beneficial to studying temperature changes in a reaction process, but also is helpful for real-time alarms, so as to ensure the production safety of chemical plants.

The existing temperature measurement technology generally applies the method of manual point temperature measurement, which relies on manual inspection conducted periodically, and thermocouples are used to collect temperature data. The existing method has the following defects: 1. the method of periodically inspection can only detect the temperature data at one specific time point, and it is difficult to monitor the temperature status in real time; 2. a thermocouple can only measure the temperature of one single position point at a time of inspection, and there exists a large blind area for monitoring which leads to incomplete monitoring, so as to cause greater safety hazards; 3. thermocouples have poor corrosion resistance and are susceptible to electromagnetic interference, and its measurement accuracy will gradually decrease, which cannot guarantee its long-term stable work under high temperature and harsh environment.

On the other hand, Fiber Bragg Grating (FBG) can be used as a fiber sensor. A FBG has the advantages of being immune to electromagnetic interference, smaller size, and corrosion-free, etc., which makes that FBG is suitable for replacing the above-mentioned thermocouple method for temperature measurement. However, the current FBG sensor does not have the sensing and monitoring capabilities in a high-temperature environment, and thus cannot satisfy the temperature measurement requirements for a reactor in the high-temperature environment as mentioned above.

SUMMARY

The present disclosure provides a reactor temperature measurement system, which can realize real-time and all-round monitoring of the internal temperature of the reactor in a high-temperature working environment, avoiding monitoring blind spots in terms of space and time, and significantly improves the accuracy and effectiveness of temperature monitoring.

A reactor temperature measurement system of the present disclosure includes: a Fiber Bragg Grating sensor array arranged in a body of the reactor, configured to monitor temperatures of multiple positions in an axial direction of the body to obtain temperature sensing optical signals; and a fiber grating demodulator connected to the Fiber Bragg Grating sensor array and configured to demodulate the temperature sensing optical signals.

In an embodiment of the reactor temperature measurement system of the present disclosure, the Fiber Bragg Grating sensor array comprises a plurality of Fiber Bragg Grating sensors, wherein each Fiber Bragg Grating sensor corresponds to a different center wavelength, and the fiber grating demodulator separates and demodulates a mixed temperature sensing optical signal comprising of multiple wavelengths into multiple independent temperature sensing optical signals.

In an embodiment of the reactor temperature measurement system of the present disclosure, in the Fiber Bragg Grating sensor array, a minimum axial distance between adjacent Fiber Bragg Grating sensors is 1 to 2 cm.

In an embodiment of the temperature measurement system of a reactor of the present disclosure, the Fiber Bragg Grating sensor array is separated from an inner wall of the body in a radial direction.

In an embodiment of the reactor temperature measurement system of the present disclosure, the reactor temperature measurement system of the present disclosure further comprises at least one layer of protective tube sleeved outside the Fiber Bragg Grating sensor array.

In an embodiment of the reactor temperature measurement system of the present disclosure, the reactor temperature measurement system of the present disclosure further comprises at least two Fiber Bragg Grating sensor arrays, and the Fiber Bragg Grating sensors in the at least two Fiber Bragg Grating sensor arrays are staggered in the axial direction of the body.

In an embodiment of the reactor temperature measurement system of the present disclosure, the Fiber Bragg Grating sensor array is annealed at a temperature above 400° C. for 100 to 200 hours to achieve a maximum operating temperature of 400° C.

In an embodiment of the temperature measurement system of a reactor of the present disclosure, the reactor temperature measurement system of the present disclosure further comprises a reference Fiber Bragg Grating sensor arranged outside the body for obtaining a reference temperature sensing optical signal.

Another aspect of the present disclosure provides a reactor, which can be applied to the reactor temperature measurement system as mentioned above, comprising: a body; and a Fiber Bragg Grating sensor array arranged in the body and configured to monitor temperatures at multiple positions in an axial direction of the reactor to obtain temperature sensing optical signals.

In an embodiment of a reactor of the present disclosure, the Fiber Bragg Grating sensor array comprises a plurality of Fiber Bragg Grating sensors and each Fiber Bragg Grating sensor corresponds to a different center wavelength.

In an embodiment of a reactor of the present disclosure, in the Fiber Bragg Grating sensor array, a minimum axial distance between adjacent Fiber Bragg Grating sensors is 1 to 2 cm.

In an embodiment of a reactor of the present disclosure, the reactor of the present disclosure further comprises at least one layer of protective tube sleeved outside the Fiber Bragg Grating sensor array.

In an embodiment of a reactor of the present disclosure, the reactor of the present disclosure further comprises at least two Fiber Bragg Grating sensor arrays, and the Fiber Bragg Grating sensors in the at least two Fiber Bragg Grating sensor arrays are staggered in the axial direction of the body.

In an embodiment of a reactor of the present disclosure, the Fiber Bragg Grating sensor array is annealed at a temperature above 400° C. for 100 to 200 hours to achieve a maximum operating temperature of 400° C.

In an embodiment of a reactor of the present disclosure, the reactor is a fixed bed reactor.

Another aspect of the present disclosure also provides a method for preparing a Fiber Bragg Grating, comprising the following steps: preparing a Fiber Bragg Grating by using a single-mode fiber; and annealing the Fiber Bragg Grating, which includes heating the Fiber Bragg Grating to a temperature above 400° C. and maintaining for 100 to 200 hours.

In an embodiment of a method for preparing a Fiber Bragg Grating of the present disclosure, the single-mode fiber is not hydrogen loaded, and a 193 nm laser is used to write the single-mode fiber to prepare a Fiber Bragg Grating.

BRIEF DESCRIPTION OF THE DRAWING(S)

The accompanying drawings are included to provide a further understanding of the application. They are included and constitute a part of the application. The accompanying drawings show embodiments of the application and serve to explain the principle of the disclosure together with the description. In the attached figures.

DETAILED DESCRIPTION

In order to clearly explain the technical solutions of the embodiments according to the present application, further illustration about the figures as described by embodiments will be made below. Obviously, the figures in the following description are just some examples of the application. For those of ordinary skill in the art, without creative work, the application can be made to other similar scenarios according to these drawings. Unless it is obvious from the language environment or otherwise stated, the same reference numerals in the figures represent the same structure or operation.

As shown in the present application and claims, unless the context clearly indicates exceptions, the words "a", "an", "an" and/or "the" do not specifically refer to the singular, but may also include the plural. Generally speaking, the terms "including" and "comprising" only suggest that the clearly identified steps and elements are included, and these steps and elements do not constitute an exclusive list, and the method or device may also include other steps or elements.

Unless specifically stated otherwise, the relative arrangement of components and steps, numerical expressions and numerical values set forth in these embodiments do not limit the scope of the present application. At the same time, it should be understood that, for ease of description, the sizes of the various parts shown in the drawings are not drawn in accordance with actual proportional relationships. The technologies, methods, and equipment known to those of ordinary skill in the relevant fields may not be discussed in detail, but where appropriate, the technologies, methods, and equipment should be regarded as part of the authorization specification. In all the examples shown and discussed herein, any specific value should be interpreted as merely exemplary but not limiting. Therefore, other examples of the exemplary embodiment may have different values. It should be noted that similar reference numerals and letters indicate similar items in the following drawings, so once an item is defined in one drawing, it does not need to be further discussed in the subsequent drawings.

In the description of this application, it needs to be understood that orientation words such as "front, back, up, down, left, right", "horizontal, vertical, vertical, horizontal" and "top, bottom", etc. only indicate the orientation or positional relationship based on the positional or positional relationship shown in the drawings, which is only for the convenience of describing the application and simplifying the description. Unless otherwise stated, these positional words do not indicate or imply the pointed device or element must have a specific orientation or be constructed and operated in a specific orientation, so it cannot be understood as a limitation of the protection scope of the present application; the orientation word "inner and outer" refers to the inside and outside relative to the contour of each component itself.

For ease of description, spatially relative terms such as "above", etc. can be used here to describe the spatial positional relationship between one device or feature and other devices or features as shown in the figure. It should be understood that the spatially relative terms are intended to encompass different orientations in use or operation other than the orientation of the device described in the figure. For example, if the device in the drawing is inverted, then a device is described as "above other devices or structures" or "above other devices or structures" will be positioned as "below other devices or structures" or "under other devices or structures". Thus, the exemplary term "above" can include both orientations "above" and "below". The device can also be positioned in other different ways (rotated by 90 degrees or in other orientations), and the relative description of the space used here is explained accordingly.

In addition, it should be noted that the use of terms such as "first" and "second" to define parts is only for the convenience of distinguishing the corresponding parts. Unless otherwise stated, the above words have no special meaning and therefore cannot be understood to limit the scope of protection of this application. In addition, although the terms used in this application are selected from well-known and public terms, some of the terms mentioned in the specification of this application may be selected by the applicant according to his or her judgment. The detailed meanings are described in the relevant part of the description. In addition, it is required to understand the present application not only through the actual terms used, but also through the meaning contained in each term.

It should be understood that when a component is referred to as being "on another component", "connected to another component", "coupled to another component" or "contacting another component", it can be directly on, connected to or coupled to, or in contact with the other component, or an intervening component may be present. In contrast, when a component is referred to as being "directly on," "directly connected to," "directly coupled to," or "directly in contact with" another component, there is no intervening component. Similarly, when the first component is referred to as "electrical contact" or "electrically coupled to" the second component, there is an electrical path between the first component and the second component that allows current to flow. The electrical path may include capacitors, coupled inductors, and/or other components that allow current to flow, even without direct contact between conductive components.

Embodiment 1

Embodiment of the present disclosure proposes a reactor temperature measurement system and a reactor, as well as a method for preparing a Fiber Bragg Grating, which can realize real-time and all-round monitoring of the internal temperature of the reactor under high temperature working environment, avoiding blind spots of monitoring both in terms of space and time, and significantly improving the accuracy and effectiveness of temperature monitoring.

Figure 1:
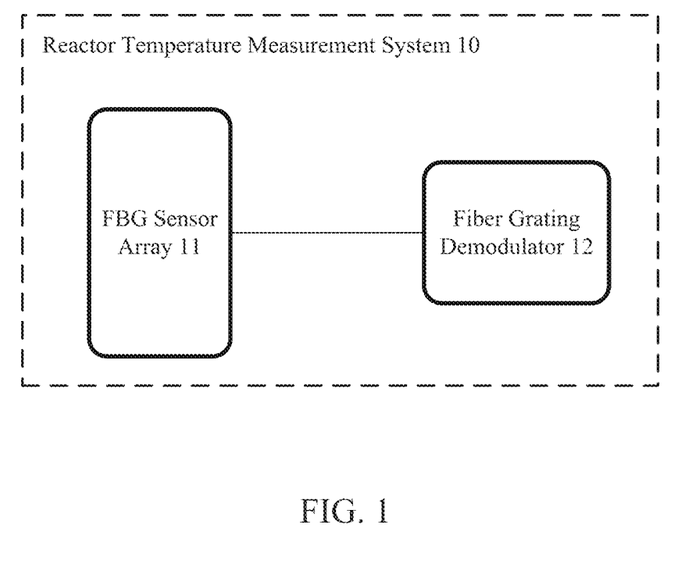
FIG. 1 is a block diagram of a reactor temperature measurement system according to an embodiment of the present disclosure.
Figure 2:
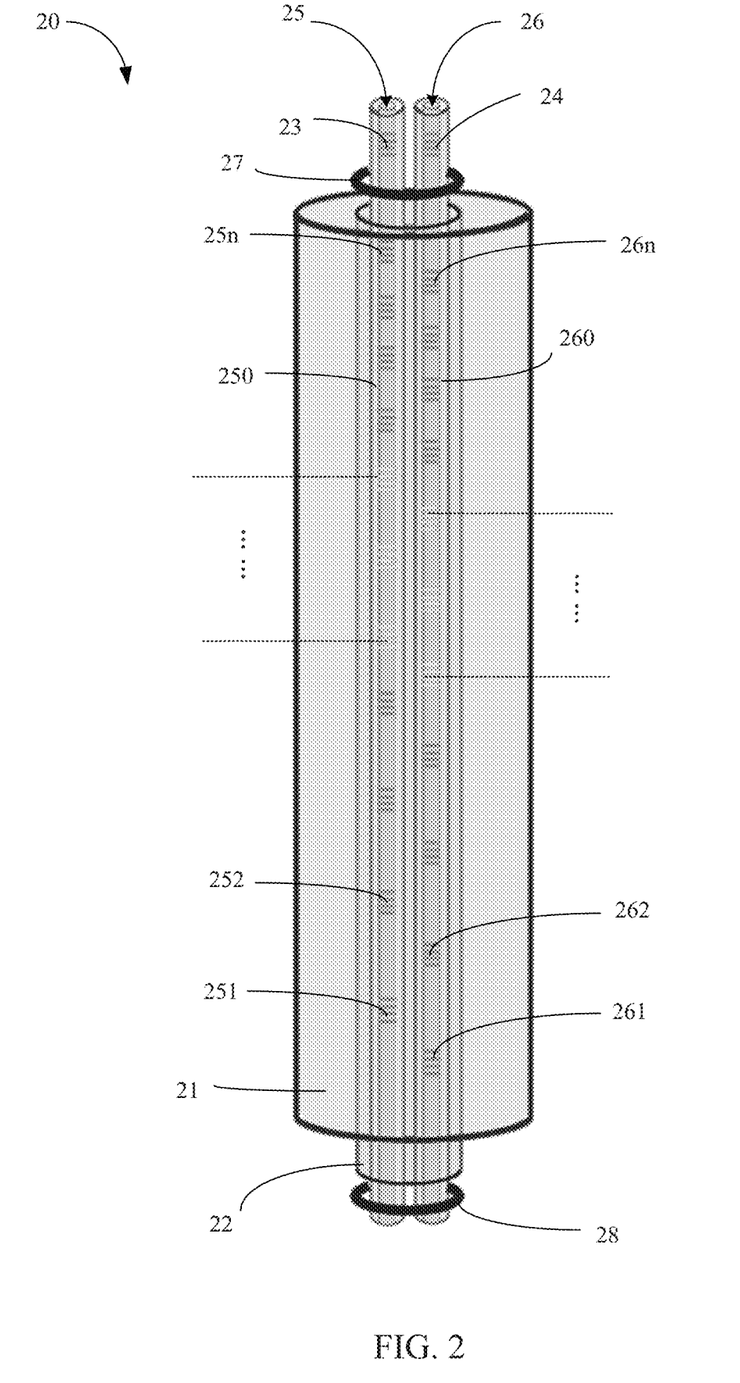
FIG. 2 is a schematic structural diagram of a reactor according to an embodiment of the present disclosure.

FIG. 1 is a block diagram of a reactor temperature measurement system according to the embodiment 1 of the present disclosure. FIG. 2 is a schematic structural diagram of a reactor according to the embodiment 1 of the present disclosure. The reactor 20 as shown in FIG. 2 is applicable for the reactor temperature measurement system 10 as shown in FIG. 1. It is understandable that the present disclosure is not limited to this application, and those skilled in the art, according to actual production needs, can independently apply the reactor temperature measurement system as shown in FIG. 1, independently apply the reactor as shown in FIG. 2, or apply a combination of the two, then various modifications belong to the spirit and scope of the present disclosure. The reactor temperature measurement system and a reactor according to an embodiment of the present disclosure will be described below with reference to FIG. 1 and FIG. 2.

As shown in FIG. 1, a reactor temperature measurement system 10 of the present disclosure comprises a FBG sensor array 11 and a fiber grating demodulator 12.

In the embodiment 1 of the present disclosure, as shown in FIG. 1, the FBG sensor array 11 in the reactor temperature measurement system 10 of the present disclosure comprises two independent FBG sensor arrays. As shown in FIG. 2, in a reactor temperature measurement system 10 of the embodiment 1 of the present disclosure, the FBG sensor array 11 is arranged in the body 21 of the reactor 20, which is reflected as a first FBG sensor array 25 and a second FBG sensor array 26, used to monitor the temperature of multiple positions in an axial direction of the main body 21 to obtain temperature sensing signals.

It is understandable that the present disclosure does not limit the number of FBG sensor arrays. FIG. 2 and the embodiment 1 only exemplarily show the implementation of a reactor temperature measurement system with two FBG sensor arrays according to the present disclosure. For example, for those skilled in the art, the number of FBG sensor arrays can be changed and adjusted according to actual production needs, such as the actual size of the body and the available FBG sensor arrays, then various changes and adjustments belong to the spirit and scope of the present disclosure.

Further, the fiber grating demodulator 12 of the present disclosure as shown in FIG. 1 is configured to connect the FBG sensor array 11 and demodulate the temperature sensing light signal obtained by the FBG sensor array 11. Exemplarily, the fiber grating demodulator 12 may contain 16 channels, with a wavelength range of 1460-1620 nm, a wavelength resolution of 1 pm, and a scanning frequency of 1000 Hz. The high-speed data scanning frequency ensures the accuracy of wavelength demodulation of the fiber grating demodulator.

It can be understood that the structure of the fiber grating demodulator 12 is not the focus of the present disclosure and will not be expanded here. Those skilled in the art can select a suitable fiber grating demodulator from the market according to actual production needs, for purpose of realizing the reactor temperature measurement system according to the present disclosure, then all choices and adjustments should belong to the spirit and scope of the present disclosure.

In the embodiment 1 of the present disclosure, the FBG sensor array 11 in the reactor temperature measurement system 10 of the present disclosure comprises a plurality of FBG sensors, and each FBG sensor corresponds to a different center wavelength.

Exemplarily, as shown in FIG. 2, the FBG sensor array 11 in the reactor temperature measurement system 10 in the embodiment 1 of the present disclosure is reflected as a first FBG sensor array 25 and a second FBG sensor array 26, and the first FBG sensor array 25 comprises a plurality of FBG sensors 251, 252, ..., 25n, and the second FBG sensor array 26 also includes a plurality of FBG sensors 261, 262, ..., 26n (the FBG sensors that are not labeled in FIG. 2 are represented by ellipsis and dotted lines). Moreover, as shown in FIG. 2, each FBG sensor in the two FBG sensor arrays is staggered in the axial direction of the body 21.

Specifically, the first FBG sensor array 25 is formed by connecting multiple FBGs written on the same optical fiber in series, which are reflected as multiple FBG sensors 251, 252, ..., 25n, and the second FBG sensor array 26 is formed by connecting multiple FBGs written on the other same optical fiber in series, which are reflected as multiple FBG sensors 261, 262, ..., 26n. Therefore, in this embodiment 1, the total number of monitoring position spots of the reactor in the axial direction of the body 21 of the reactor temperature measurement system is the sum of the number of FBG sensors on the two FBG sensor arrays, that is, 2n.

In an embodiment of the present disclosure, the minimum axial distance between adjacent FBG sensors in the reactor temperature measurement system according to the present disclosure is 1 to 2 cm.

Further, each FBG sensor located within the same FBG sensor array corresponds to a different center wavelength, that is, FBG sensor 251, 252, ..., 25n located within the first FBG sensor array corresponds to a different center wavelength with each other, while FBG sensor 261, 262, ..., 26n located within the second FBG sensor array 26 also corresponds to different center wavelength with each other.

Therefore, the temperature monitoring principle of a reactor temperature measurement system of the present disclosure can be understood as that, the above-mentioned FBGs corresponding to different center wavelengths can reflect optical signals of different wavelength bands, the fiber grating demodulator 12 as shown in FIG. 1 can separate and demodulate the mixed optical signals of multiple wavelengths into independent optical signals, and each signal is within a different waveband. As a result, the position of the FBG sensor corresponding to each signal on the corresponding FBG sensor array can be identified, so as to achieve real-time monitoring of the body temperature, as well as rapid positioning of abnormal temperature conditions.

In an embodiment of the present disclosure, adjacent FBGs are allocated with corresponding reasonable center wavelength intervals to ensure that there is no blind zone in the position spot area monitored by the FBG, and it should meet the maximum temperature change that can accommodate the corresponding FBG sensor, which will not cause overlap of adjacent FBG reflection spectra. Therefore, in a reactor temperature measurement system of the present disclosure, each FBG works independently without interfering with each other.

Exemplarily, the corresponding reasonable center wavelength interval allocation for adjacent FBGs can be set according to the following method. For example, the maximum wavelength range corresponding to the fiber grating demodulator is 160 nm, according to the actual requirements of the temperature measurement range, such as 0 to 200 degrees Celsius, each FBG can reserve a maximum wavelength range of 2.5 nm, and therefore, 64 FBG sensors in total can be provided within one optical fiber. In this case, the center wavelength of each of the adjacent FBGs differs by 2.5 nm, and the FBG wavelength change due to temperature changes is only about 2 nm. Therefore, in actual temperature measurement, the wavelengths of different FBGs will not overlap, and will not cause mutual influence.

The reactor temperature measurement system according to the present disclosure can monitor temperatures inside the reactor in real time, and provide a reference basis for the temperature distribution inside the reactor; the simultaneous sensing of temperature on multiple position points inside the reactor achieves a full range of temperature monitoring, avoiding blind spots when monitoring temperature; and the system is anti-corrosion and easy to install, and can work safely in high temperature and other alike harsh environments.

FIG. 2 and the above description only exemplarily show the arrangement of the FBG sensors in the temperature measurement system based on the reactor of two FBG sensor arrays in the embodiment 1 of the present disclosure. It can be understood that, except for the need to meet a certain condition of the center wavelength, the present disclosure does not make other restrictions on the specific position and arrangement of the FBG sensors on the corresponding FBG sensor array. For example, the FBG sensors located on the same FBG sensor array can be arranged at equal intervals or unequal intervals, or the arrangement of the FBG sensors can be selected according to the actual situation where temperature measurement is particularly required. Any adjustment to the specific position and arrangement of each FBG sensor in the temperature measurement system of a reactor of the present disclosure on the corresponding FBG sensor array for actual production needs should belong to the spirit and scope of the present disclosure.

In the embodiment 1 of the present disclosure, the FBG sensor array 11 as shown in FIG. 1 is separated from the inner wall of the body 21 in a radial direction. Specifically, as shown in FIG. 2, the first FBG sensor array 25 and the second FBG sensor array 26 are separated from the inner wall of the body 21 respectively, that is, there is a gap.

Further, in the embodiment 1 of the present disclosure, the reactor temperature measurement system of the present disclosure further includes a protective tube, which is sleeved outside the FBG sensor array 11 as shown in FIG. 1. As shown in FIG. 2, it is specifically embodied as a first protective tube 250 sleeved outside the first FBG sensor array 25 and a second protective tube 260 sleeved outside the second FBG sensor array 26.

Exemplarily, the encapsulation method of the two ends of the first protective tube 250 and/or the second protective tube 260 may be sealed by ultraviolet curing glue. The encapsulation of the protective tube can protect each FBG, especially when the reactor temperature measurement system of the present disclosure has two or more FBG sensor arrays; the protective tube can effectively avoid the interaction between the FBG sensor arrays and will not negatively affect the temperature measured by each FBG sensor. It is understandable that the specific material and packaging method of the protective tube is not the focus of the present disclosure, and thus it will not be elaborated in the present article. Any material or apparatus that can protect each FBG in order to realize the reactor temperature measurement system of the present disclosure, such as the protective tube mentioned above, belongs to the spirit and scope of the present disclosure.

In an embodiment of the present disclosure, the reactor temperature measurement system of the present disclosure further includes an external protective tube, which is additionally sleeved outside the FBG sensor array which has been encapsulated with the above protective tube. As shown in FIG. 2, it is specifically embodied as that the external protective tube 22 is sleeved outside the whole of the first FBG sensor array 25 and the second FBG sensor array 26 which are respectively in the first protective tube 250 and the second protective tube 260. The external protective tube 22 can further prevent the internal FBG sensor array from being affected by impurities in the internal environment of the reactor.

Exemplarily, the material of the protective tube and the external protective tube may be stainless steel tube, quartz tube, ceramic tube, etc. The melting point of the protective tube and the external protective tube is generally greater than 1000° C., which can realize mechanical protection of the FBG sensor array at high temperature, prevent the FBG sensor array from breaking due to external stress, and ensure that the FBG sensor still possesses relatively good temperature sensitivity. It is understandable that the material and specific structure of the protective tube and the external protective tube are not the focus of the present disclosure and will not be elaborated herein. Those skilled in the art can select and/or adjust material and size of the protective tube and the external protective tube according to actual production needs, and then various choices and adjustments should belong to the spirit and scope of the present disclosure.

Furthermore, as shown in FIG. 2, the FBG sensor array in the temperature measurement system of a reactor in the embodiment 1 of the present disclosure is often arranged in a vertical state inside the reactor in actual production. Therefore, in the embodiment 1 of the present disclosure, the FBG sensor array 11 in a reactor temperature measurement system 10 of the present disclosure also has a fixing device at both ends to ensure that the FBG sensor array stays in a vertical state and will not fall off naturally. Specifically, as shown in FIG. 2, the first fixing device 27 is configured to fix the upper ends of the first FBG sensor array 25 and the second FBG sensor array 26, and the second fixing device 28 is configured to fix the lower ends of the first FBG sensor array 25 and the second FBG sensor array 26. The fixing devices are configured to ensure that the two rows of sensor arrays are kept in a vertical state in the main body 21 but will not fall off naturally.

Exemplarily, the above-mentioned fixing device may be composed of screws and screw caps. It can be understood that the specific material and structure of the fixing device are not the focus of the present disclosure. Any fixing device or simple material which is configured to fix the FBG sensor arrays of the present disclosure shall belong to the spirit and structure of the present disclosure.

In the embodiment 1 of the present disclosure, the reactor temperature measurement system 10 of the present disclosure further includes a reference FBG sensor, which is arranged outside the body 21 and configured to obtain a reference temperature sensing optical signal. As shown in FIG. 2, it is specifically embodied that the first reference FBG sensor 23 and the second reference FBG sensor 24 are located outside the main body 21 and correspond to the first FBG sensor array 25 and the second FBG sensor array 26 respectively.

Exemplarily, the first reference FBG sensor 23 and the second reference FBG sensor 24 are located outside the temperature measurement area of the reactor, that is, outside the body 21. When the first FBG sensor array 25 and/or the second FBG sensor array 26 are influenced by external environmental factors and then generate system errors, through analysis of the change of corresponding center wavelength of the FBG contained in the first reference FBG sensor 23 and the second reference FBG sensor 24, the corresponding center wavelength of the FBG contained in the first FBG sensor array 25 and/or the second FBG sensor array 26 can be compensated correspondingly, thereby realizing the calibration of the temperature measurement effect of the FBG sensor array.

In the embodiment 1 of the present disclosure, the FBG sensor array in the temperature measurement system of a reactor of the present disclosure is an FBG sensor array obtained by annealing at a temperature above 400° C. for 100 to 200 hours, thereby making the maximum working temperature of the FBG sensor array in the reactor temperature measurement system to reach 400° C.

On the other hand, a reactor 20 is provided in the embodiment 1 of the present disclosure, which is suitable for applying in the above-mentioned reactor temperature measurement system as shown in FIG. 1 and can realize real-time and all-round monitoring of the internal temperature of the reactor under high temperature working environment, avoiding blind spots of monitoring in terms of both space and time, and significantly improving the accuracy and effectiveness of temperature monitoring.

As shown in FIG. 2, the reactor 20 includes a body 21 and two rows of FBG sensor arrays, which respectively are a first FBG sensor array 25 and a second FBG sensor array 26, both of which are arranged in the body 21 for monitoring the temperature of reactor 20 at multiple positions in the axial direction to obtain a temperature sensing optical signal.

As shown in FIG. 2, the first FBG sensor array 25 and the second FBG sensor array 26 each includes a plurality of FBG sensors, which respectively are 251, 252, . . . , 25n and 261, 262, . . . , 26n. The above-mentioned FBG sensors are staggered in the axial direction of the main body 21. The center wavelengths corresponding to the FBGs contained in each FBG sensor are different, which is used to realize the judgment and positioning of the abnormal temperature position.

In the embodiment 1, in the FBG sensor array in a reactor of the present disclosure, the minimum axial distance between adjacent FBG sensors is 1 to 2 cm.

In the embodiment 1, a reactor 20 of the present disclosure further includes a protective tube, embodied as a first protective tube 250 sleeved outside the first FBG sensor array 25, and a second FBG sensor array 26 sleeved outside the second protective tube 260.

In the embodiment 1, the first FBG sensor array 25 and the second FBG sensor array 26 in a reactor 20 of the present disclosure are obtained by annealing at a temperature above 400° C. for 100 to 200 hours, so that the maximum working temperature of the FBG sensor array of a reactor of the present disclosure can reach 400° C.

In Embodiment 1, a reactor 20 of the present disclosure is a fixed bed reactor, and it is understandable that the present disclosure is not limited as such. In actual production, the temperature measurement and monitoring of any reaction tower or reaction pipeline can adopt any similar temperature measurement structure of the above-mentioned reactor 20, and is suitable for the reactor temperature measurement system as shown in FIG. 1.

For the specific structure and other details of the reactor 20, reference may be made to the above description of the reactor temperature measurement system of Embodiment 1, and will not be repeated herein.

On the other hand, the embodiment 1 of the present disclosure also proposes a method for preparing a Fiber Bragg Grating (FBG). The FBG prepared by the method can be applied to the above-mentioned reactor and the reactor temperature measurement system, thereby achieving real-time and all-round monitoring of the internal temperature of the reactor under high temperature working environment, avoiding blind spots of monitoring in terms of both space and time, and significantly improving the accuracy and effectiveness of temperature monitoring.

Specifically, a method for preparing an FBG according to the embodiment 1 of the present disclosure is to prepare the FBG using a single-mode optical fiber, to anneal the FBG includes heating the FBG to above 400° C. and maintaining it for 100 to 200 hours. Through long-time high temperature annealing, the center wavelength corresponding to the FBG temperature sensor reaches a stable state, so that the annealed FBG can work at a temperature below 400° C. for a long term.

The method for preparing a Fiber Bragg Grating according to the present disclosure uses special techniques such as annealing to make the Fiber Bragg Grating sensor achieves a maximum measurable temperature of 400° C., which fully satisfies the temperature measurement requirements of a reactor for working in a high temperature environment.

In an embodiment of the present disclosure, the above-mentioned single-mode fiber is hydrogen loaded, and a 193 nm laser is used to write the single-mode fiber to prepare FBG. Exemplarily, the FBG prepared in different single-mode fibers is generally about 100 to 200 hours.

Embodiment 2

The second embodiment of the present disclosure proposes another reactor temperature measurement system on the basis of the embodiment 1. The temperature measurement system can realize real-time and all-round monitoring of the internal temperature of the reactor, as well as the linkage control and quick response.

Figure 3:
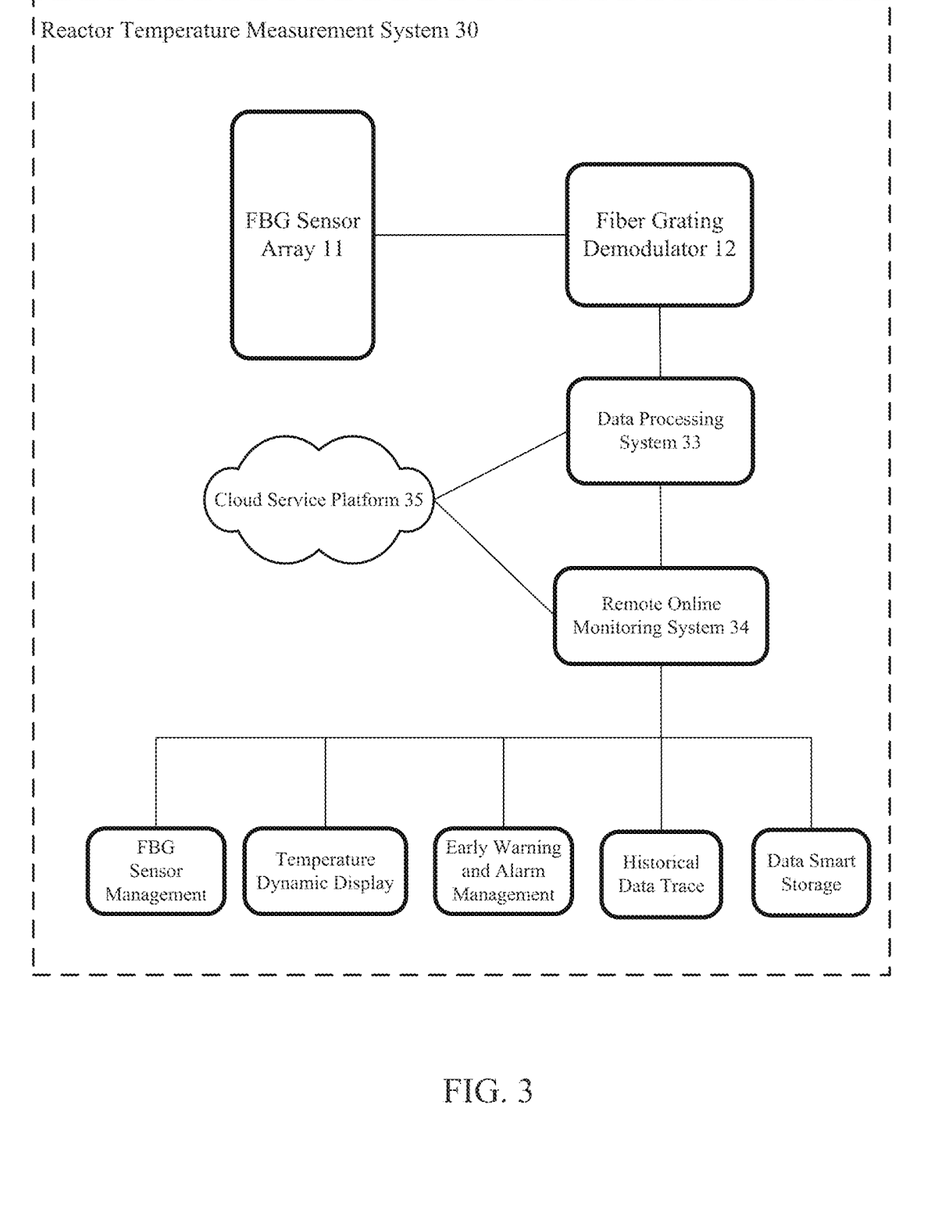
FIG. 3 is a block diagram of a temperature measurement system of a reactor according to another embodiment of the present disclosure.

FIG. 3 is a block diagram of a reactor temperature measurement system according to another embodiment of the present disclosure. In the embodiment as shown in FIG. 3, a reactor temperature measurement system 30, besides the FBG sensor array 11 and fiber grating demodulator 12 as involved in the embodiment 1, further includes a data processing system 33, a remote online monitoring system 34, and a cloud service platform 35. The remote online monitoring system 34 may have conventional software functions as shown in FIG. 3, thereby forming an extension and perfection of the reactor temperature measurement system.

As shown in FIG. 3, the specific structure of the FBG sensor array 11 and the working settings of the fiber grating demodulator can be referred to the description of the embodiments shown in FIG. 1 and FIG. 2, and will not be repeated herein.

Exemplarily, the fiber grating demodulator 12 analyzes the data, which are transmitted by the fiber grating demodulator 12, through the Ethernet interface and an upload module of the data processing system 33, and then further uploads the data to the cloud service platform 35, and the cloud service platform uses MYSQL database for data storage. The remote online monitoring system 34 exchanges data and information with the cloud service platform 35 through a network, and can monitor the temperature information of the position monitored by each grating sensor in real time.

Further illustratively, when the temperature value of the position monitored by the FBG sensor exceeds the early warning value or alarm value set by the remote online monitoring platform 34, the monitoring system will issue an early warning or alarm information so that the staff can take timely measures to prevent further breakdowns. By entering a FBG sensor number and the start and end time, temperature changes monitored by the FBG sensor during a certain time period can be queried.

It can be understood that the software design part in the second embodiment with reference to FIG. 3 is not the focus of the present disclosure and will not be expanded herein. FIG. 3 and the above description of the second embodiment only exemplarily show the temperature measurement system and the reactor based on a reactor of the present disclosure, equipped with corresponding software equipment, and normal functions such as abnormal alarm and data storage. The temperature monitoring task of complete linkage and rapid response is realized, thereby constituting the deformation and perfection of the reactor temperature measurement system of the present disclosure.

The basic concepts have been described above. Obviously, for those skilled in the art, the foregoing disclosure of the disclosure is merely an example, and does not constitute a limitation to the application. Although it is not explicitly stated here, those skilled in the art may make various modifications, improvements and amendments to this application. Such modifications, improvements, and corrections are suggested in this application, so such modifications, improvements, and corrections still belong to the spirit and scope of the exemplary embodiments of this application.

At the same time, this application uses specific words to describe the embodiments of the application. For example, "one embodiment", "an embodiment", and/or "some embodiments" mean a certain feature, structure, or characteristic related to at least one embodiment of the present application. Therefore, it should be emphasized and noted that "an embodiment" or "an embodiment" or "an alternative embodiment" mentioned twice or more in different positions in this specification does not necessarily refer to the same embodiment. In addition, certain features, structures, or characteristics in one or more embodiments of the present application can be appropriately combined.

Some aspects of this application can be completely executed by hardware, or software (including firmware, resident software, microcode, etc.), or can be executed by a combination of hardware and software. The above hardware or software can be referred to as "data block", "module", "engine", "unit", "component" or "system". The processor can be one or more application specific integrated circuits (ASIC), digital signal processor (DSP), digital signal processing device (DAPD), programmable logic device (PLD), field programmable gate array (FPGA), processor, controller, microcontroller, microprocessor, or a combination thereof. In addition, various aspects of this application may be represented as a computer product located in one or more computer-readable media, and the product includes computer-readable program codes. For example, computer-readable media may include, but are not limited to, magnetic storage devices (for example, hard disks, floppy disks, magnetic tapes . . . ), optical disks (for example, compact discs, digital versatile disks DVD . . . ), smart cards, and flash memory devices (for example, cards, sticks, key drives . . . ).

The computer-readable medium may contain a propagated data signal containing a computer program code, for example on baseband or as part of a carrier wave. The propagation signal may have multiple manifestations, including electromagnetic, optical, etc., or a suitable combination. The computer-readable medium may be any computer-readable medium other than a computer-readable storage medium, and the medium may be connected to an instruction execution system, apparatus, or device to realize communication, propagation, or transmission of the program for use. The program code located on the computer-readable medium can be transmitted through any suitable medium, including radio, cable, fiber optic cable, radio frequency signal, or similar medium, or any combination of the foregoing medium.

For the same reason, it should be noted that, in order to simplify the expressions disclosed in this application and to help the understanding of one or more embodiments of the disclosure, in the foregoing description of the embodiments of this application, multiple features are sometimes combined into one embodiment, one figure or its description. However, this method of disclosure does not mean that the subject of the application requires more features than those mentioned in the claims. In fact, the features of the embodiment are less than all the features of the single embodiment disclosed above.

Some examples use numbers to describe the number of ingredients and attributes. It should be understood that such numbers used in the description of the examples use the modifier "about", "approximately" or "substantially" in some examples. Unless otherwise stated, "approximately", "approximately" or "substantially" indicates that the number is allowed to vary by ±20%. Correspondingly, in some embodiments, the numerical parameters used in the description and claims are approximate values, and the approximate values can be changed according to the required characteristics of individual embodiments. In some embodiments, the numerical parameter should consider the prescribed effective digits and adopt the method of general digit retention. Although the numerical ranges and parameters used to confirm the breadth of the ranges in some embodiments of the present application are approximate values, in specific embodiments, the setting of such numerical values is as accurate as possible within the feasible range.

Although the present application has been described with reference to the current specific embodiments, those of ordinary skill in the art should recognize that the above embodiments are only used to illustrate the application, and various equivalent changes or substitutions can be made without departing from the spirit of the application. Therefore, as long as the changes and modifications of the foregoing embodiments are within the essential spirit of the present application, they will fall within the scope of the claims of the present application.

What is claimed is:

1. A reactor temperature measurement system, comprising:
    a Fiber Bragg Grating sensor array arranged in a body of the reactor, configured to monitor temperatures of multiple positions in an axial direction of the body to obtain temperature sensing optical signals; and
    a fiber grating demodulator connected to the Fiber Bragg Grating sensor array and configured to demodulate the temperature sensing optical signals;
    wherein the Fiber Bragg Grating sensor array comprises a plurality of Fiber Bragg Grating sensors, and a minimum axial distance between adjacent Fiber Bragg Grating sensors is 1 to 2 cm.

2. The reactor temperature measurement system according to claim 1, wherein the Fiber Bragg Grating sensor array is separated from an inner wall of the body in a radial direction.

3. The reactor temperature measurement system according to claim 1, further comprising at least one layer of a protective tube sleeved outside of the Fiber Bragg Grating sensor array.

4. The reactor temperature measurement system according to claim 1, wherein the Fiber Bragg Grating sensor array is annealed at a temperature above 400° C. for 100 to 200 hours to achieve a maximum operating temperature of 400° C.

5. The reactor temperature measurement system according to claim 1, further comprising a reference Fiber Bragg Grating sensor arranged outside of the body for obtaining a reference temperature sensing optical signal.

6. The reactor temperature measurement system according to claim 1, wherein each Fiber Bragg Grating sensor corresponds to a different center wavelength, and wherein the fiber grating demodulator is configured to separate and demodulate a mixed temperature sensing optical signal comprised of multiple wavelengths into multiple independent temperature sensing optical signals.

7. The reactor temperature measurement system according to claim 6, further comprising at least two Fiber Bragg Grating sensor arrays, wherein the Fiber Bragg Grating sensors in the at least two Fiber Bragg Grating sensor arrays are staggered in the axial direction of the body.

8. A method for preparing a Fiber Bragg Grating applied in the reactor temperature measurement system according to claim 1, wherein the method comprises the following steps:
    preparing the Fiber Bragg Grating by using a single-mode fiber; and
    annealing the Fiber Bragg Grating, which includes heating the Fiber Bragg Grating to a temperature above 400 ° C. and maintaining for 100 to 200 hours.

9. The method according to claim 8, wherein the single-mode fiber is not hydrogen loaded, and wherein a 193 nm laser is used to write the single-mode fiber to prepare the Fiber Bragg Grating.

10. A reactor, comprising:
    a body; and
    a Fiber Bragg Grating sensor array arranged in the body and configured to monitor temperatures at multiple positions in an axial direction of the reactor to obtain temperature sensing optical signals;
    wherein the Fiber Bragg Grating sensor array comprises a plurality of Fiber Bragg Grating sensors, and a minimum axial distance between adjacent Fiber Bragg Grating sensors is 1 to 2 cm.

11. The reactor according to claim 10, further comprising at least one layer of a protective tube sleeved outside of the Fiber Bragg Grating sensor array.

12. The reactor according to claim 10, wherein the Fiber Bragg Grating sensor array is annealed at a temperature above 400° C. for 100 to 200 hours to achieve a maximum operating temperature of 400° C.

13. The reactor according to claim 10, wherein the reactor is a fixed bed reactor.

14. The reactor according to claim 10, wherein each Fiber Bragg Grating sensor corresponds to a different center wavelength.

15. The reactor according to claim 14, further comprising at least two Fiber Bragg Grating sensor arrays, wherein the Fiber Bragg Grating sensors in the at least two Fiber Bragg Grating sensor arrays are staggered in the axial direction of the body.

* * * * *